US011541395B1

(12) United States Patent
Dobson et al.

(10) Patent No.: US 11,541,395 B1
(45) Date of Patent: Jan. 3, 2023

(54) SYSTEM AND METHOD FOR SEX SORTING OF MOSQUITOES

(71) Applicant: MosquitoMate, Inc., Lexington, KY (US)

(72) Inventors: Stephen L. Dobson, Lexington, KY (US); James William Mains, Morehead, KY (US); Jim L. Peyton, Richmond, KY (US); Hakim Sultanov, Lexington, KY (US)

(73) Assignee: MosquitoMate, Inc., Lexington, KY (US)

( * ) Notice: Subject to any disclaimer, the term of this patent is extended or adjusted under 35 U.S.C. 154(b) by 689 days.

(21) Appl. No.: 16/546,581

(22) Filed: Aug. 21, 2019

Related U.S. Application Data

(60) Provisional application No. 62/720,386, filed on Aug. 21, 2018.

(51) Int. Cl.
*B01L 3/00* (2006.01)
*A01M 1/06* (2006.01)
*H04N 5/225* (2006.01)
*G06V 20/10* (2022.01)

(52) U.S. Cl.
CPC ........... *B01L 3/50853* (2013.01); *A01M 1/06* (2013.01); *G06V 20/10* (2022.01); *H04N 5/2253* (2013.01); *B01L 2300/04* (2013.01); *B01L 2300/0829* (2013.01)

(58) Field of Classification Search
CPC ......... B01L 2300/0829; B01L 3/50853; B01L 2300/04
USPC .................................................. 422/552, 553
See application file for complete search history.

(56) References Cited

U.S. PATENT DOCUMENTS

| 7,868,222 | B1 | 1/2011 | Dobson |
| 2013/0259846 | A1 | 10/2013 | Dobson |
| 2015/0152475 | A1* | 6/2015 | Kordunsky ........ G01N 21/6452 435/287.2 |

* cited by examiner

*Primary Examiner* — Natalia Levkovich
(74) *Attorney, Agent, or Firm* — Stites & Harbison, PLLC; David W. Nagle, Jr.

(57) ABSTRACT

A system for sex sorting of mosquitoes generally comprises: (i) a plate or similar receptacle that includes multiple wells, with each of the multiple wells configured to receive a mosquito; and (ii) an imaging subsystem, including a camera for capturing images of the mosquito in each of the multiple wells and a computer for analyzing the captured images to determine whether each mosquito is male or female. Mosquitoes have distinct anatomical areas for identification, which are captured in the images and are used to determine if a mosquito is male or female. Furthermore, in some implementations, the system includes a suction device or other means for exterminating the unwanted mosquitoes after the determination of whether each mosquito is male or female.

21 Claims, 7 Drawing Sheets

SYSTEM AND METHOD FOR SEX SORTING OF MOSQUITOES

CROSS-REFERENCE TO RELATED APPLICATIONS

The present application claims priority to U.S. Patent Application Ser. No. 62/720,386 filed on Aug. 21, 2018, the entire disclosure of which is incorporated herein by reference.

BACKGROUND OF THE INVENTION

Malaria, dengue and dengue haemorrhagic fever, West Nile Virus (WNV) and other encephalites, human African trypanosomiasis (HAT), human filariasis, dog heartworm and other pathogens important to animals are on the increase. These diseases are transmitted via insects and, in particular, mosquitoes.

There are approximately 3,500 species of mosquitoes in the world, and at least 176 of these species are found in the United States. Mosquitoes are nuanced insects that are sub-divided into genera. There are 41 different types of genera; however, the majority of the species of mosquitoes that spread disease fall within three genera: *Culex, Anopheles*, and *Aedes*.

*Culex* mosquitoes can be active throughout the year, but tend to hibernate over the winter as adults. Most breeding occurs during the warmer months, with the *Culex* mosquitoes laying rafts of eggs at night on the surface of standing water anywhere it can be found. Over a period of about one to two weeks, larvae will hatch, develop into pupae, and then into adult mosquitoes. Depending on the species, the adult mosquitoes do not travel more than a few hundred yards from where they hatched. The adult female mosquitoes feed primarily at night and are considered aggressive and persistent biters, although many *Culex* species prefer birds to humans. Only female mosquitoes blood feed, as they need the protein in the blood to develop eggs. Adult *Culex* mosquitoes can live up to approximately one month. In this generus, a medically important mosquito is the *Culex pipiens*, which is also known as the northern house mosquito. It is a primary carrier of the West Nile Virus, as further discussed below.

*Anopheles* mosquitoes also tend to breed during the warmer months, but can also be active throughout the year. Females also deposit their eggs on the surface of water in groups of 50 to 200. Immature growth is analogous to the developmental process for *Culex* mosquitoes. Immature *Anopheles* mosquitoes can be readily identified by their tendency to lie parallel to the water surface unlike most other mosquito genera. While *Culex* mosquitoes can breed and thrive in stagnant or polluted water, the *Anopheles* mosquitoes prefer clean water habitats in marshes, swamps, and rice fields, among others. The adult females usually live about two weeks and feed predominantly at dusk and dawn. Several of the medically important *Anopheles* species tend to feed on humans and cattle. *Anopheles* mosquitoes are the carriers of the parasite that causes malaria, which can be transmitted through their saliva when they bite, as further discussed below.

*Aedes* mosquitoes oviposit their eggs on moist soil or in containers that periodically accumulate rainfall, such as tree holes, plastic containers, overflow ditches, and old tires. The eggs can survive drying and hatch once flooded by water. The mosquitoes advance through the same four-stage developmental process as other mosquitoes. As a predominantly tropical and subtropical group, *Aedes* mosquitoes tend to breed in warm weather, although some species can thrive in temperate environments. Adult female mosquitoes can feed both during the day and at night, and several of the species are considered particularly troublesome. Many floodwater and saltmarsh species (e.g., *Aedes vexans* and *Aedes taeniorhynchus*) are becoming significant nuisance species, as they tend to be very numerous, aggressive, and painful biters. Two *Aedes* mosquitoes are also significant vectors of diseases that afflict humans. *Aedes albopictus* (Asian tiger mosquito) and *Aedes aegypti* (yellow fever mosquito) are capable of transmitting viruses responsible for Dengue, Zika, Chikungunya and Yellow Fever, as further discussed below.

Further description of the diseases transmitted by mosquitoes can be found in U.S. Pat. No. 7,868,222 entitled "Transfected Mosquito Vectors" and U.S. Patent Publication No. 2013/0259846 entitled "Method for Mosquito Control," each of which is incorporated herein by reference.

With respect to such diseases, few drugs are available for treatment of major arthropod-borne viruses, which are also referred to as arboviruses. Thus, the focus is often on controlling mosquito (or other insect) populations. For instance, as also described in U.S. Patent Publication No. 2013/0259846, methods for controlling mosquito populations often include the use of pesticides and vector control methods. However, existing insecticidal control methods rely upon field technicians, who often fail to find and treat many breeding sites, which can be numerous, cryptic and inaccessible. Additional methods consist of area-wide treatment via airplane or wind-assisted dispersal from truck-mounted foggers. Unfortunately, the latter fail to treat many breeding sites and are complicated by variable environmental conditions. Surveys of natural and artificial water containers demonstrate mosquitoes and other arthropods to be highly efficient in finding, inhabiting and laying eggs in variously sized, cryptic water pools, including tree holes and gutters high above ground level.

In response to the limitations and deficiencies of prior control methods, U.S. Pat. No. 7,868,222, which, as noted above, is incorporated herein by reference, describes a method for producing an artificial *Wolbachia* infection in a Culicidae (mosquito) species. The mosquitoes include species within the subfamilies Culicinae and Anophelinae, and the species include *Aedes albopictus, Aedes aegypti,* and *Aedes polynesiensis* infected with a *Wolbachia* infection. The infection may be a strain of *Wolbachia* which does not normally or naturally infect the selected mosquito species. The artificially infected *Aedes* mosquitoes can be introduced into a mosquito population to control the reproduction capability of the population by introducing an incompatible *Wolbachia* infection.

The *Wolbachia* biopesticide approach differs from existing mosquito control measures in that it is a self-delivering, species-specific biological control with a novel mode of action and no known resistance. The approach is based upon repeated, inundative releases of incompatible male mosquitoes that are artificially infected with *Wolbachia* bacteria. Male *Ae. albopictus* do not blood feed or transmit disease and have evolved effective means to locate females. One thousand *Ae. albopictus* males costs a few dollars to produce and can find females more effectively than a team of the best trained professionals. Prior mass-rearing efforts have produced in excess of one million male mosquitoes/day continuously for a year.

The *Wolbachia* biopesticide is registered with the U.S. Environmental Protection Agency ("EPA"), and the approach can be used to complement existing insecticide-based control measures. The EPA has granted approval (Section 3 Registration and Experimental Use Permits) for the open release of *Wolbachia* biopesticide in mosquitoes as a control tool. The *Wolbachia* biopesticide is not affected by other larvicide applications, and the *Wolbachia* biopesticide is species-specific and will not affect non-targeted species (e.g., beneficial insects). However, as alluded to above, the application of the *Wolbachia* biopesticide requires that only males infected with *Wolbachia* be released. Male mosquitoes do not bite. When they mate, the eggs do not hatch due to the cytoplasmic incompatibility (CI) caused by *Wolbachia*. When the male mosquitoes die, the *Wolbachia* bacterium dies also since *Wolbachia* is an obligate symbiont that is incapable of existing outside its host. Over time, as fewer eggs develop into adults, the overall population is reduced below densities required for disease transmission.

Thus, any process for producing mosquitoes in mass quantities must include an effective means to sort and separate the mosquitoes by sex, so that only male mosquitoes are released with the *Wolbachia* biopesticide. Additionally, there may be other reasons to sort and separate the mosquitoes by sex. In this regard, the *Wolbachia* biopesticide is just one autocidal method that deploys male mosquitoes, and other methods that make use of only male mosquitoes include certain sterile insect techniques (SIT), release of insects carrying a dominant lethal technology (MDL) techniques, methods based on certain genetic modification of mosquitoes, and mark-release-recapture experiments.

As mentioned above, there are established techniques for mass-rearing of mosquitoes. In this regard, lines that are stably infected with *Wolbachia* are expanded by continuing to rear all offspring generated by females. As one female can generate several hundred eggs, the line can be expanded to thousands of insects within a few generations. In other words, once a line is infected, the infection persists in the line without additional effort, since the bacterium is maternally transmitted to both daughters and sons.

With respect to rearing the mosquito strains, mosquito eggs are induced into hatching with deoxygenated water. Resulting immature mosquitoes (larvae) are then transferred to trays of water for further development. Mosquito larvae are not fastidious and use a variety of food resources. Depending upon availability and cost, food provided to the larvae can range from powdered liver to various types of pet food. Immature mosquitoes are preferably maintained at a density no greater than 1 larva/ml.

Prior to eclosion into the adult stage, immature mosquitoes at the pupal stage are removed from the trays and transferred to buckets containing the pupae and water. The buckets are placed inside adult screened cages (30×30×30 cm) where they develop into adults. A 10% sucrose solution may be provided to the mosquitoes for adult nutrition. Female mosquitoes may be further provided weekly with a blood meal (e.g., bovine blood) for egg development. Post blood feeding, oviposition containers lined with paper are placed into cages where females oviposit eggs. Egg papers are collected weekly from the adult cages. After an egg maturation period following collection, eggs are submerged in deoxygenated water, and the rearing process is repeated. Safety protocols for containment of mosquito strains are followed and maintained to ensure that mosquitoes are not inadvertently released.

For male mosquitoes intended to be used for field releases, as described above, there must be a means by which to sort and separate the mosquitoes by sex, so that only male mosquitoes are released with the *Wolbachia* biopesticide. For example, one common technique is to separate males from females at the pupal stage using a mechanical separation device. The separation device consists of an aluminum plate supporting two glass panes that delimit an adjustable, downward-pointing wedge-shaped space between them, into which the immature mosquitoes are poured. Due to naturally occurring sexual dimorphism (i.e., female pupae are larger than male pupae), pupae can be separated on the basis of size by regulating the thickness and angle of the wedge shape. However, this technique is limited in its accuracy, and some level of female contamination can be expected. Thus, one or more visual examinations are often conducted after mechanical separation to identify and remove any residual females as adults, which greatly reduces the probability that any females will be overlooked prior to release. However, such visual examinations are very labor and time-intensive Thus, there remains a need for a more effective system and method for sex sorting of mosquitoes.

SUMMARY OF THE INVENTION

The present invention is a system and method for sex sorting of mosquitoes.

A system made in accordance with the present invention generally comprises: (i) a plate or similar receptacle that includes multiple wells, with each of the multiple wells configured to receive a mosquito; and (ii) an imaging subsystem, including a camera for capturing images of the mosquito in each of the multiple wells and a computer for analyzing the captured images to determine whether each mosquito is male or female.

In some embodiments, there is also a lid that is placed over the plate to enclose the wells once mosquitoes have been placed in the wells. However, the lid includes multiple viewing windows, with each of the multiple viewing windows aligned with and corresponding to one of the wells.

The camera of the imaging subsystem captures images of the mosquitoes in each of the wells. Such imaging preferably takes place after the mosquitoes transition from the pupal stage to the adult stage (via eclosion) while in the wells. The capture of the images by the camera can be accomplished, for example, by a robot or mechanical arm that moves the camera over the top of the lid of the plate, such that the camera captures an image of each of the mosquitoes through the respective viewing windows of the lid. For example, in some embodiments, the camera is mounted to a robotic framework that allows the camera to be moved in two directions—along an x-axis and a y-axis, so that the camera may be moved over the top of the lid of the plate, well to well.

As the images are captured by the camera, the images are transmitted to and stored in a memory component of a computer, which is also part of the imaging subsystem. Computer-readable instructions are then executed by a processor of the computer to analyze the captured images.

In this regard, mosquitoes have three distinct anatomical areas for identification, which are captured in the images. These areas are referred sexually dimorphic characters and include: (i) antennae (plumose or not); (ii) labial palps (elongate or not); and (iii) terminalia (fork-shaped or not). An analysis of any one of these three anatomical areas in each image can be used to determine if a mosquito is male or female, and, of course, an analysis of all three anatomical areas leads to even better accuracy.

Thus, the analysis of the images, as carried out by the computer, focuses on one or more of these three anatomical areas to determine if each mosquito is male or female. Various known image analysis techniques can be used to make such a comparison. Once such analysis has been completed, the results are output, for example, via a display screen of the computer.

An exemplary method according to the present invention thus generally comprises the steps of: (i) providing a plate or similar receptacle that includes multiple wells, with each of the multiple wells configured to receive a mosquito; (ii) filling each of the multiple wells with a predetermined volume of water; (iii) placing a mosquito in each of the multiple wells, preferably in the pupal stage; (iv) waiting a time period for eclosion of the mosquitoes into the adult stage; (v) capturing an image of each mosquito in each of the multiple wells; (vi) analyzing each image to determine if the mosquito is male or female; and (vii) outputting the results of the analysis, i.e., the determination of whether each mosquito is male or female.

Finally, since the purpose of the above-described sex sorting is ultimately to ensure that only male mosquitoes are released, a means for exterminating (or removing) the unwanted mosquitoes, i.e., the mosquitoes that are determined to be female, may be incorporated into the system and method of the present invention.

DETAILED DESCRIPTION OF THE INVENTION

The present invention is a system and method for sex sorting of mosquitoes.

A system made in accordance with the present invention generally comprises: (i) a plate or similar receptacle that includes multiple wells, with each of the multiple wells configured to receive a mosquito; and (ii) an imaging subsystem, including a camera for capturing images of the mosquito in each of the multiple wells and a computer for analyzing the captured images to determine whether each mosquito is male or female.

Figure 1:
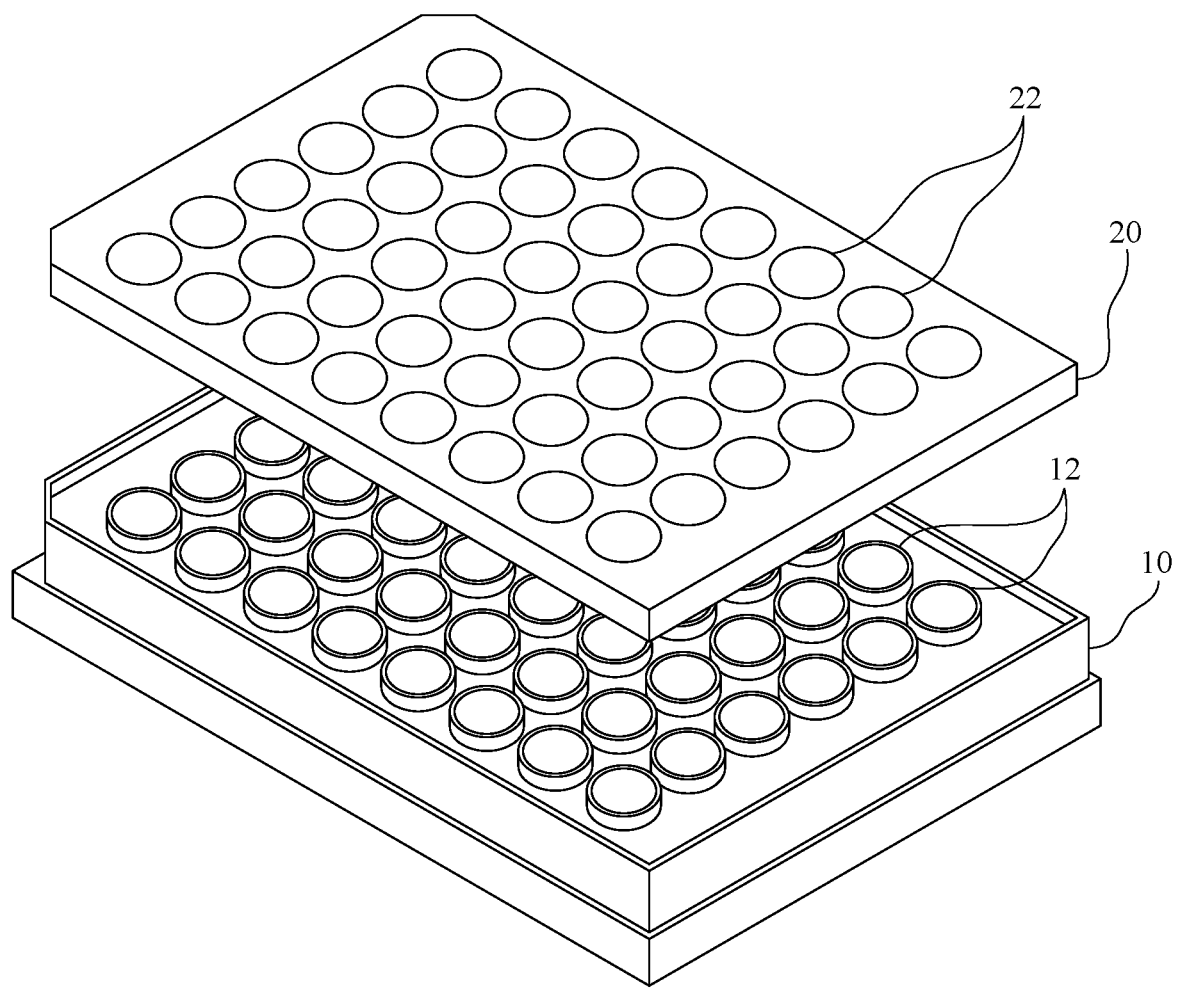
FIG. 1 is a perspective view of a plate and associated lid for use in an exemplary system for sex sorting of mosquitoes made in accordance with the present invention.

FIG. 1 is a perspective view of a plate 10 for use in an exemplary system for sex sorting of mosquitoes made in accordance with the present invention. As shown, in this exemplary embodiment, the plate includes forty-eight (48) individual wells 12, with each such well 12 configured to receive a mosquito (not shown in FIG. 1), which would preferably be in the pupal stage at the time of placement. Of course, more or fewer wells could be included in the plate 10 without departing from the spirit and scope of the present invention. Furthermore, each well 12 preferably contains a predetermined volume of water, such that the mosquito typically stands and essentially floats on the surface of the water, the importance of which will be further described below.

Referring still to FIG. 1, in this exemplary embodiment, there is also a lid 20 that is placed over the plate 10 to enclose the wells 12 once mosquitoes have been placed in the wells 12. The lid 20 could be formed from various materials, including, but not limited to, rigid plastics or more flexible plastic films. Of course, the lid 20 prevents escape of the mosquitoes. However, the lid 20 includes multiple viewing windows 22, with each of the multiple viewing windows 22 aligned with and corresponding to one of the wells 12.

Figure 2:
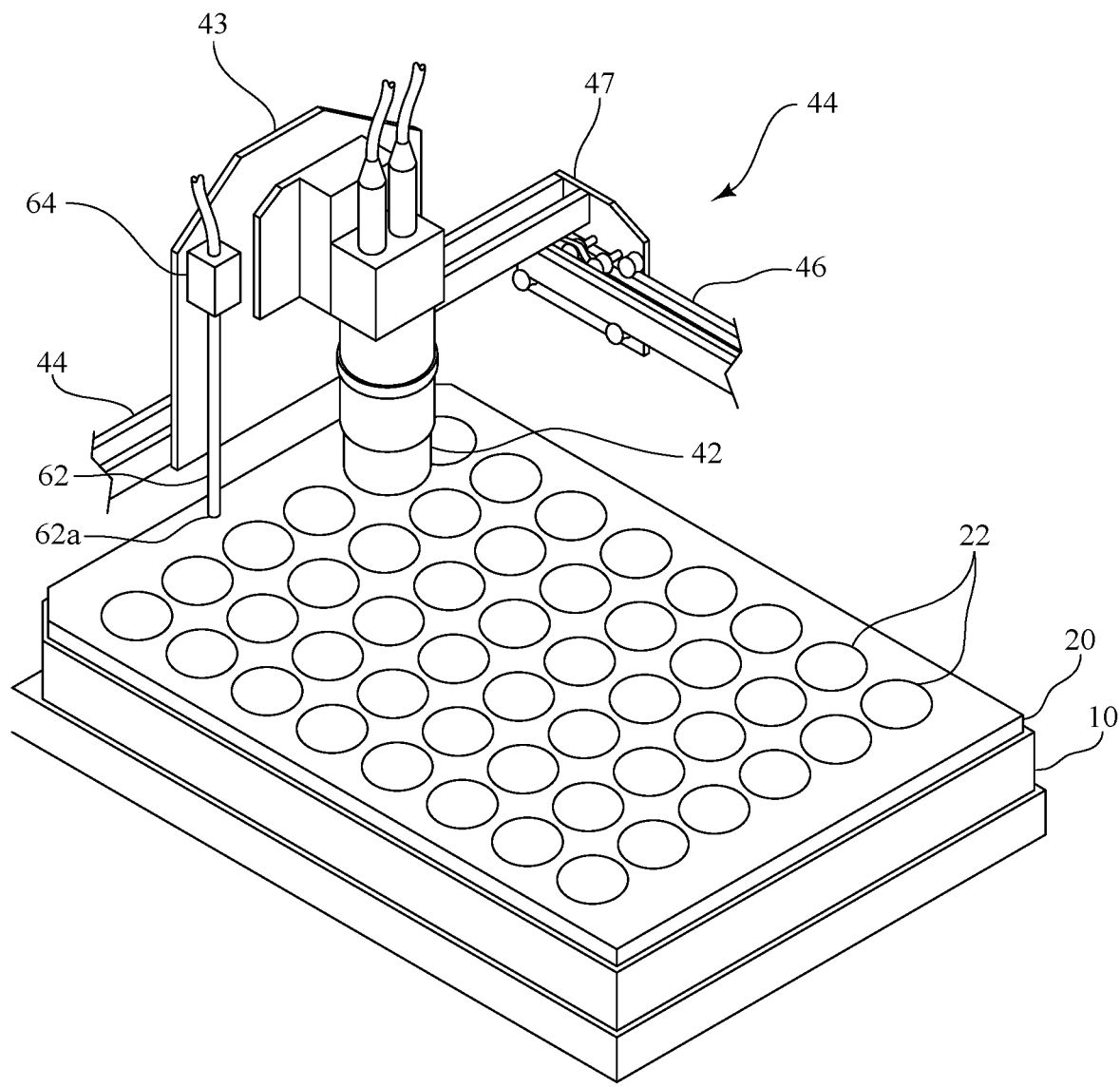
FIG. 2 is a perspective view of the plate and associated lid of FIG. 1, along with certain components of an imaging subsystem, in the exemplary system for sex sorting of mosquitoes made in accordance with the present invention.
Figure 3:
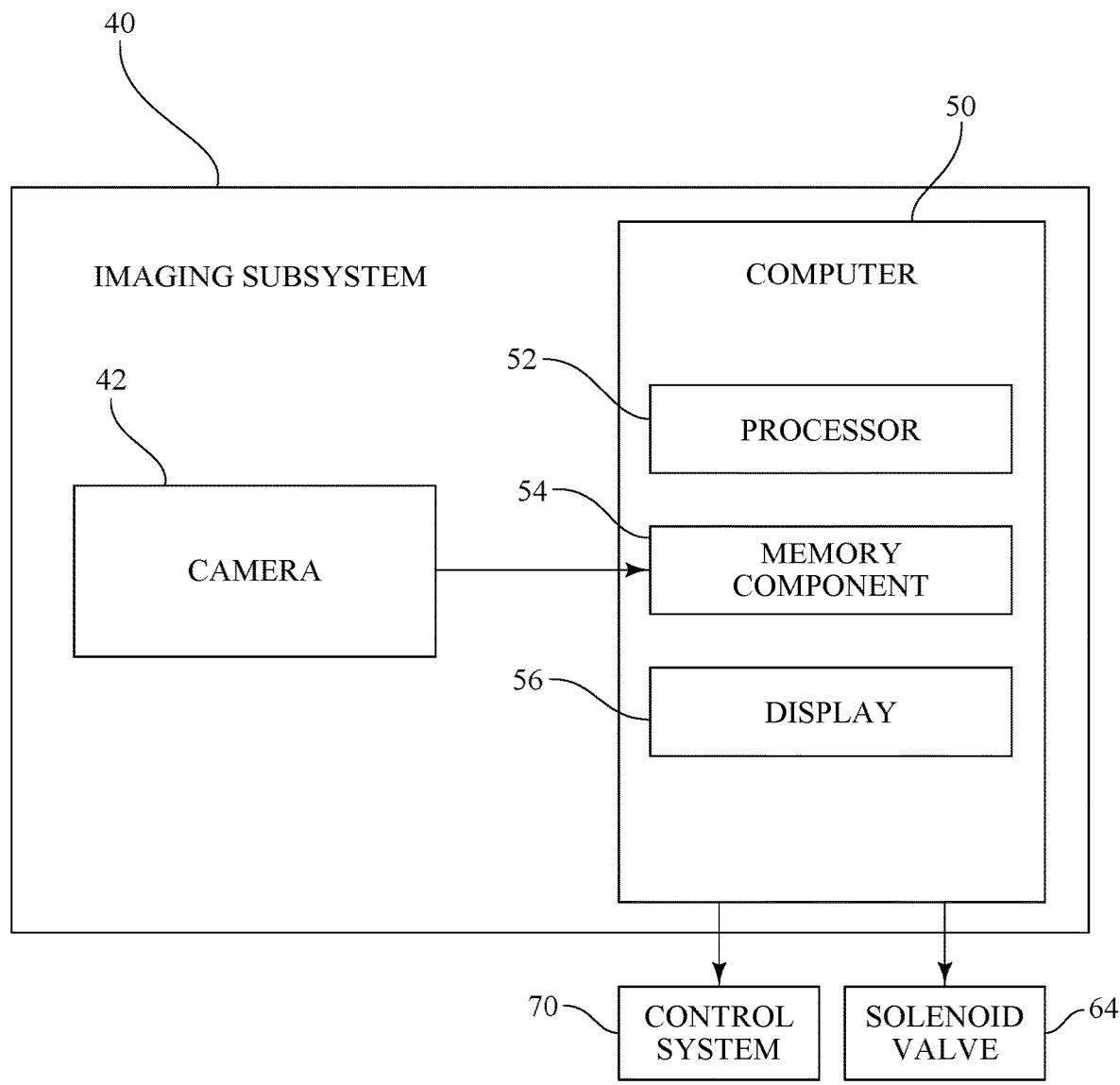
FIG. 3 is a schematic view of an imaging subsystem in the exemplary system for sex sorting of mosquitoes made in accordance with the present invention.

Referring now to FIGS. 2 and 3, as mentioned above, the system also includes a camera 42, which is part of an imaging subsystem 40. The camera 42 captures images of the mosquitoes in each of the wells 12. As should become clear in the description that follows, such imaging preferably takes place after the mosquito transitions from the pupal stage to the adult stage (via eclosion) while in each of the wells 12. For example, one preferred camera suitable for use as part of the present invention is the Insight Micro Model 1100 manufactured and distributed by Cognex Corporation of Natick, Mass.

Referring still to FIGS. 2 and 3, the capture of the images by the camera 42 can be accomplished, for example, by a robot or mechanical arm that moves the camera 42 over the top of the lid 20 of the plate 10, such that the camera 42 captures an image of each of the mosquitoes through the respective viewing windows 22 of the lid 20. For example, in FIG. 2, the camera 42 is mounted to a robotic framework 44 that allows the camera 42 to be moved in two directions—along an x-axis and a y-axis, so that the camera 42 may be moved over the top of the lid 20 of the plate 10, well to well.

Specifically, in the preferred implementation illustrated in FIG. 2, the camera 42 is mounted to a bracket 43, which, in turn, is mounted to and moves along the length of a central rail 44 in a first direction (i.e., along the x-axis), for instance, as driven by a belt. The rail 44 is then mounted to and moves along the length of a first side rail 46 and a second side rail (not shown in FIG. 2) in a second direction (i.e., along the y-axis), as facilitated by roller assemblies 47 (one of which is visible in FIG. 2) at the respective ends of the rail 44. Of course, this is but one example of how the camera 42 can be moved over the top of the lid 20 of the plate 10, and various other means for moving the camera 42 may be employed without departing from the spirt and scope of the present invention.

Additionally, in some implementations, a control system is used to automate movement of the camera 42 relative to the plate 10 as it moves well to well. For example, in the preferred implementation illustrated in FIG. 3, the computer 50 of the imaging subsystem 40 is operably connected to a control system 70 for the robotic framework 44, such that instructions can be communicated from the computer 50 to the control system 70 to move the camera 42 over the top of the lid 20 of the plate 10, well to well.

Referring now to FIG. 3, as the images are captured by the camera 42, the images are transmitted to and stored in a memory component 54 of a computer 50, which is also part of the imaging subsystem 40. Computer-readable instructions are then executed by a processor 52 of the computer 50 to analyze the captured images.

Figures 4A, 4B:
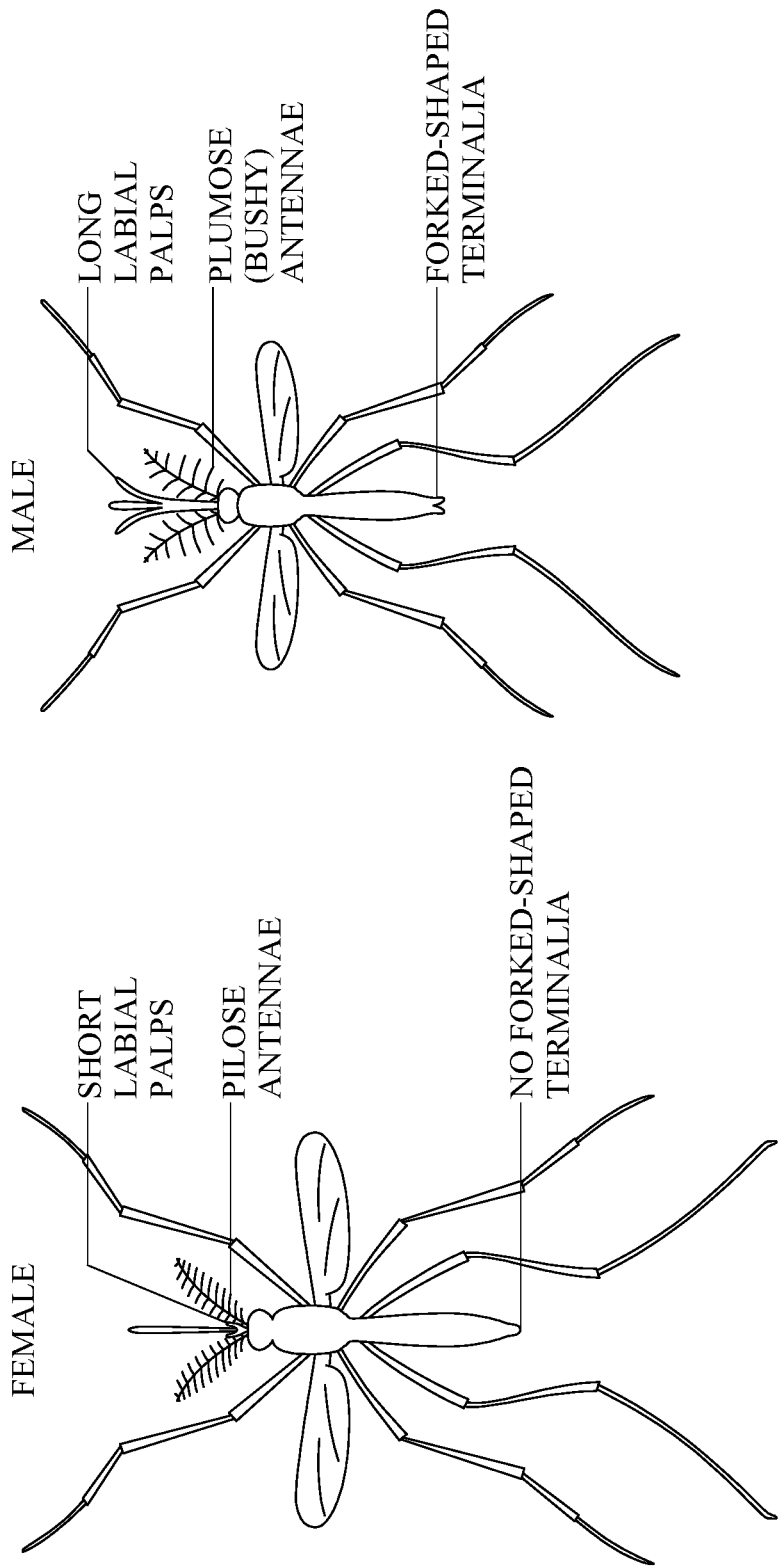
FIG. 4A is a graphic representation of a female mosquito, illustrating certain anatomical areas for identification.
FIG. 4B is an graphic representation of a male mosquito, illustrating certain anatomical areas for identification.

In this regard, mosquitoes have three distinct anatomical areas for identification, which are captured in the images. These areas are referred sexually dimorphic characters and include: (i) antennae (plumose or not); (ii) labial palps (elongate or not); and (iii) terminalia (fork-shaped or not). FIG. 4A (female) and FIG. 4B (male) illustrate each of these anatomical areas. An analysis of any one of these three anatomical areas in each image can be used to determine if a mosquito is male or female, and, of course, an analysis of all three anatomical areas leads to even better accuracy.

Thus, the analysis of the images, as carried out by the computer 50, focuses on one or more of these three anatomical areas to determine if each mosquito is male or female. Various known image analysis techniques can be used to make such a comparison. The necessary computer-readable instructions can be coded into a computer-readable form using standard programming techniques and languages, and with the benefit of the above description, such programming is readily accomplished by a person of ordinary skill in the art.

For instance, in one exemplary implementation, after capture of an image, certain preprocessing routines may first be applied to the image to remove noise or to otherwise clean the image for subsequent analysis. For example, the captured image may first be converted to a binary (black-and-white) image. Certain preprocessing routines may also applied to assist in locating and identify the mosquito and its orientation in the captured image, including, for example, the application of a dilate filter or other filters, and/or the use of certain histogram measurements of pixel values to determine the angular rotation of the body of the mosquito in the captured image.

After such preprocessing routines, one or more of the above-described anatomical areas is identified in the captured image. Such identification of each anatomical area in the captured image can be achieved, for example, via machine-assisted examination of the image. Once a particular anatomical area has been so identified, that part of the captured image (or "region of interest") is compared to the corresponding region of interest in images in a database of known images of female and male mosquitoes to determine if the mosquito is male or female. For instance, this may be achieved via the use of pattern recognition algorithms or software, which perform a pixel-by-pixel comparison of one or more regions of interest in the captured image to the corresponding regions of interest in known images of female and male mosquitoes. Of course, various other machine learning techniques could also be employed to improve the accuracy of the pattern recognition or determination if the mosquito is male or female.

Referring now to FIG. 3, once such analysis has been completed, the results are output, for example, via a display screen 56 of the computer 50.

With respect to capturing an image of each mosquito, it is important that the mosquito have the proper presentation and pose; in other words, the mosquito must be properly positioned for the camera to capture an image sufficient to carry out the desired analysis. The water in each well aids in encouraging the proper presentation and pose, as the mosquito will typically stand and float on the surface of the water. Furthermore, it should be noted that, to the extent that a particular mosquito cannot be accurately recognized, due to improper positioning or any other reason, that mosquito will be designated and "unwanted" and discarded, as further discussed below.

Figure 5:
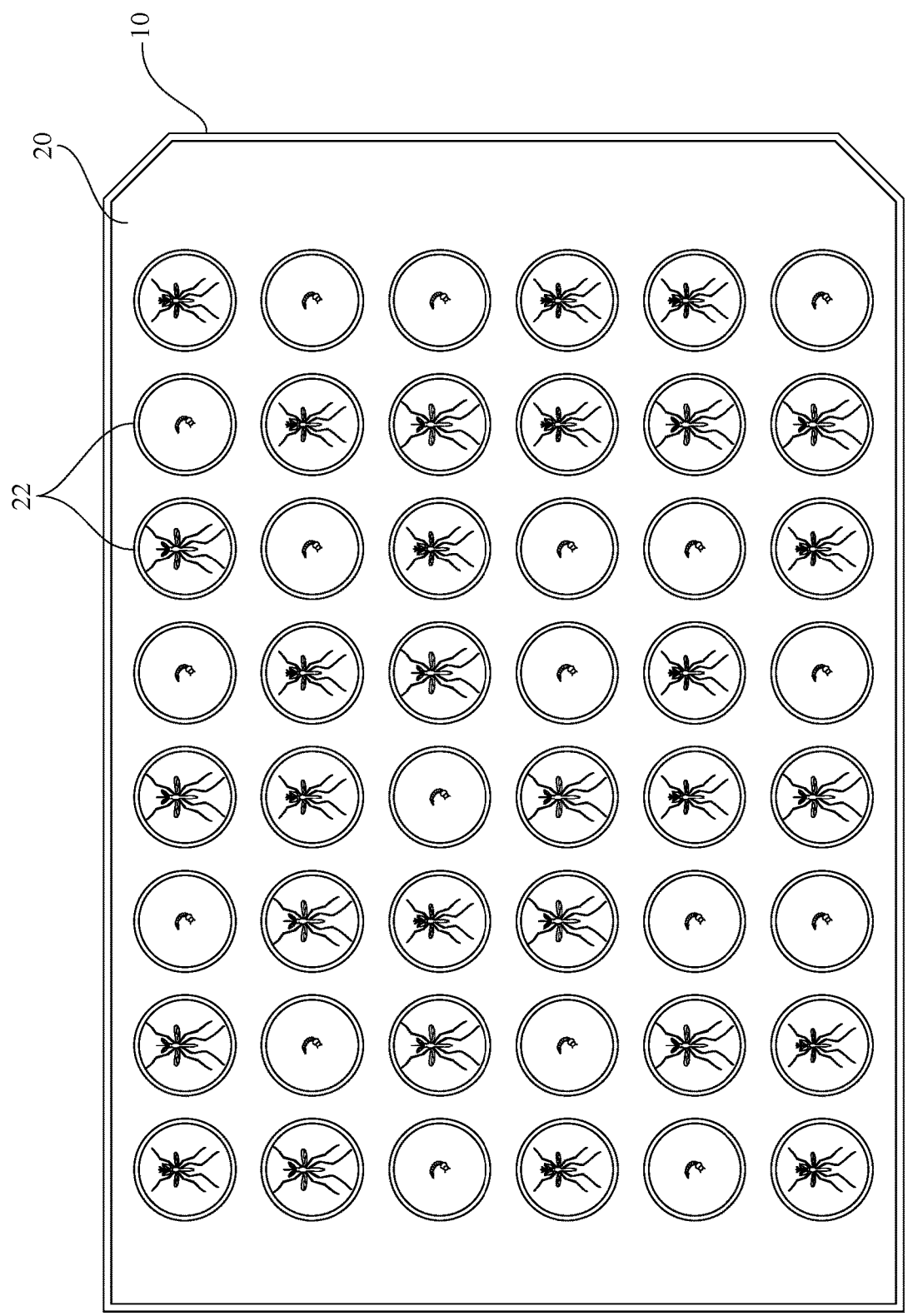
FIG. 5 is a plan view of the plate and associated lid in the exemplary system of FIGS. 1-3, wherein a mosquito has been placed in each well of the plate and is viewable through a respective viewing window in the lid.

FIG. 5 is a plan view of the plate 10 and associated lid 20, wherein a mosquito has been placed in each well and is viewable through a respective viewing window 22 in the lid 20. As shown, some of the mosquitoes are still in the pupal stage, and some of the mosquitoes have transitioned to the adult stage.

Figure 6A:
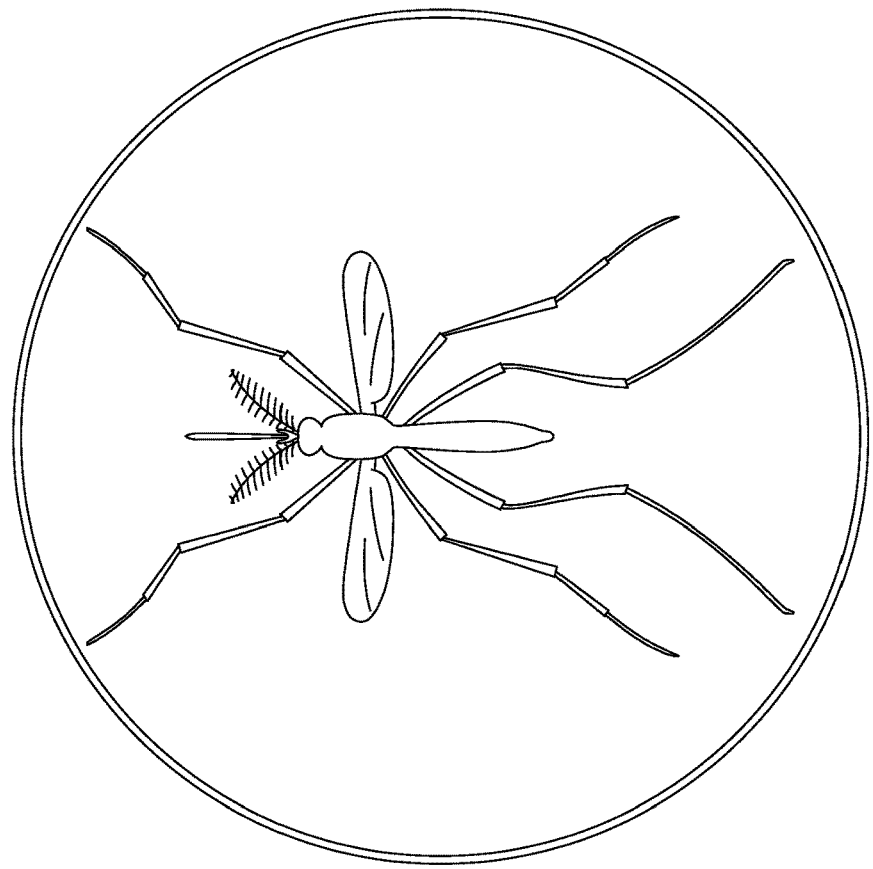
FIG. 6A is an enlarged graphic representation of an image of a female mosquito as captured by a camera through a viewing window in the lid in the exemplary system of FIGS. 1-3 and 5.
Figure 6B:
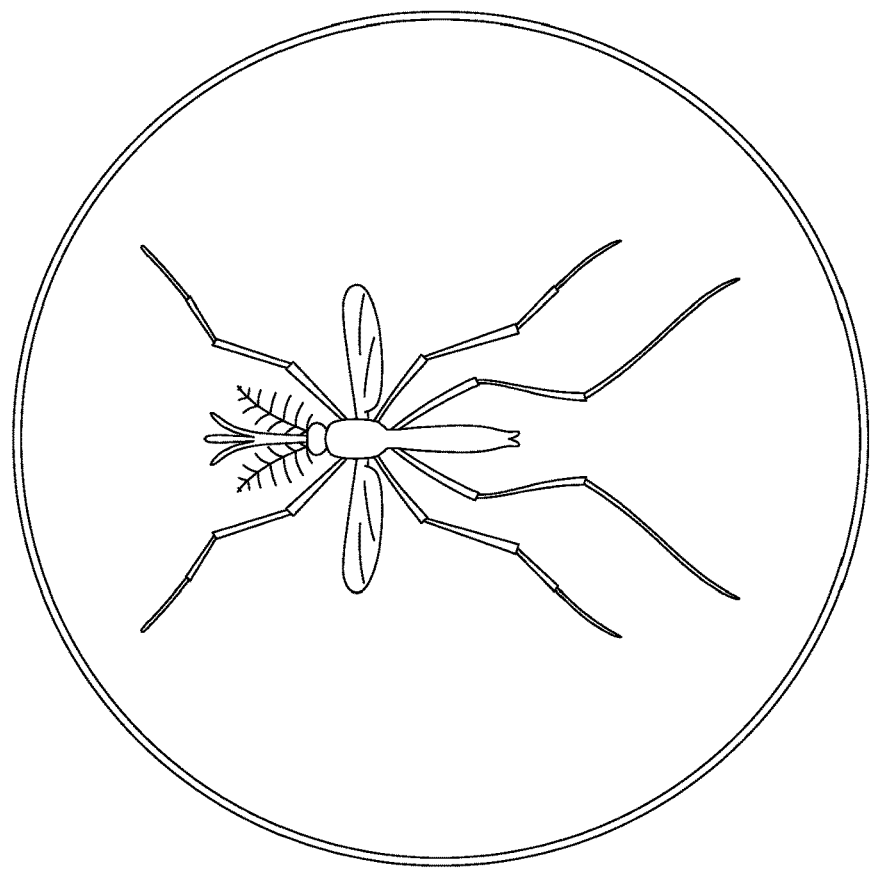
FIG. 6B is an enlarged graphic representation of an image of a male mosquito as captured by a camera through a viewing window in the lid in the exemplary system of FIGS. 1-3 and 5.

FIG. 6A is an enlarged graphic representation of an image of a female mosquito as captured by the camera through a viewing window in the lid, and FIG. 6B is an enlarged graphic representation of an image of a male mosquito as captured by the camera through a viewing window in the lid. In short, FIGS. 6A and 6B are illustrative of the images that are captured by the camera.

Figure 7:
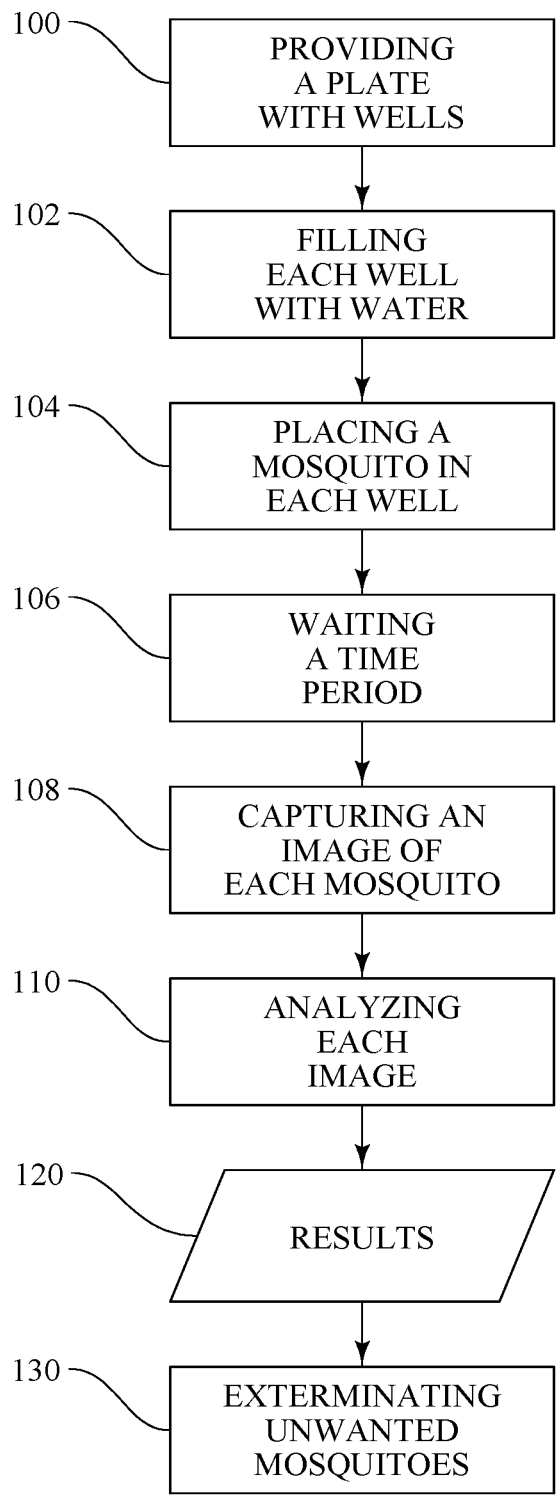
FIG. 7 is a flow chart illustrating the steps in an exemplary method for sex sorting of mosquitoes in accordance with the present invention.

Referring now to FIG. 7, an exemplary method according to the present invention thus generally comprises the steps of: (i) providing a plate or similar receptacle that includes multiple wells, with each of the multiple wells configured to receive a mosquito, as indicated by block 100; (ii) filling each of the multiple wells with a predetermined volume of water, as indicated by block 102; (iii) placing a mosquito in each of the multiple wells, preferably in the pupal stage, as indicated by block 104; (iv) waiting a time period for eclosion of the mosquitoes into the adult stage, as indicated by block 106; (v) capturing an image of each mosquito in each of the multiple wells, as indicated by block 108; (vi) analyzing each image to determine if the mosquito is male or female, as indicated by block 110; and (vii) outputting the results of the analysis, i.e., the determination of whether each mosquito is male or female, as indicated by output 120.

Of course, as described above, in some implementations, a lid is placed over the plate to enclose the wells once mosquitoes have been placed in the wells to prevent escape of the mosquitoes.

Furthermore, because condensation within the wells can be an obstacle to capturing images of the mosquitoes, as a further refinement, in some implementations, the plate and lid are chilled. Such chilling also has the advantage of making the mosquitoes dormant, in which case, the lid can be removed (if necessary) for capturing images.

Finally, since the purpose of the above-described sex sorting is ultimately to ensure that only male mosquitoes are released, a means for exterminating (or removing) unwanted mosquitoes, i.e., the mosquitoes that are determined to be female, may be incorporated into the system and method of the present invention. Such an additional method step of exterminating unwanted mosquitoes is indicated by block 130 in FIG. 7.

For example, in one preferred implementation and referring again to FIG. 2, the means for exterminating the female mosquitoes is a suction device that is mounted or otherwise incorporated into the same robotic framework 44 that supports the camera 42 of the imaging subsystem 40. Specifically, a hollow tube 62 is in fluid communication with a vacuum source (not shown). The hollow tube 44 is mounted to the same bracket 43 that carries the camera 42, and a distal end 62a of the hollow tube 62 is positioned over the surface of the plate 10. A solenoid valve 64 is interposed between the vacuum source and the distal end 62a of the hollow tube 62 to control whether suction is applied at the distal end 62a of the hollow tube 62. If and when a determination is made that a mosquito in a well 12 is female (or otherwise unwanted), the robotic framework 44 is used to position the distal end 62a of the hollow tube 62 over that well 12, the solenoid valve 64 is opened, and the resulting suction draws the female mosquito out of the well 12 and captures it downstream for disposal. Of course, for such a suction device to function, the lid 20 would have to be removed from the plate 10. Such removal could take place after imaging, or, as mentioned above, in certain implementations in which the plate 10 and lid 20 are chilled, it is possible to remove the lid 20 for capturing images. If the lid 20 has been so removed for capturing images, the suction device could be used to draw out and dispose of a mosquito immediately after the determination has been made that the mosquito is female.

Furthermore, and referring again to FIG. 3, in some implementations, the computer 50 of the imaging subsystem 40 is operably connected to the solenoid valve 64. Thus, instructions can be communicated from the computer 50 to the solenoid valve 64 to control whether suction is applied at the distal end 62a of the hollow tube 62.

As an alternative, it should also be recognized that the above-described suction device could also be used to draw out and preserve the male mosquitoes. In that case, the mosquitoes left in the wells 12 of the plate 10 would be the female mosquitoes, which could then be discarded.

For another example, the means for exterminating the mosquitoes could be in the form of a crushing tool that selectively extends into a well (along the z-axis) to crush a mosquito that has been determined to be female (or otherwise unwanted). In one preferred embodiment, the crushing tool would be in the form of an elongated shaft with an enlarged head that is used to engage and crush a mosquito. Furthermore, such a crushing tool could be mounted on the same bracket 43 that carries the camera 40, or it could be positioned via another robotic framework. In either case, such a crushing tool would preferably be extended into and retracted from an identified well via a linear actuator or other similar mechanical means, which could also be configured to receive instructions from the computer 50 of the imaging subsystem 40.

For another example, the means for exterminating the mosquitoes could be in the form of an arm that selectively extends into a well (along the z-axis) and applies an electrical current to electrocute a mosquito that has been determined to be female (or otherwise unwanted), in a manner similar to a "bug zapper." Such an arm could again be mounted on the same bracket 43 that carries the camera 40, or it could be positioned via another robotic framework. In either case, such an arm would preferably be extended into and retracted from an identified well via a linear actuator or other similar mechanical means, which could also be configured to receive instructions from the computer 50 of the imaging subsystem 40.

Again, the above are only examples of means for exterminating (or removing) the mosquitoes, and other techniques could be employed without departing from the spirt and scope of the present invention.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for sex sorting of mosquitoes, comprising:
 a plate that includes multiple wells, with each of the multiple wells configured to receive a mosquito; and
 an imaging subsystem, including
  a camera for capturing an image of a particular mosquito in one of the multiple wells, and
  a computer including a processor programmed to execute instructions to (i) receive the image captured by the camera, and (ii) analyze the image to determine whether the particular mosquito in the image is male or female.

2. The system as recited in claim 1, and further comprising a lid that is placed over the plate to enclose the multiple wells.

3. The system as recited in claim 2, wherein the lid includes multiple viewing windows, with each of the multiple viewing windows aligned with and corresponding to one of the multiple wells.

4. The system as recited in claim 1, wherein the camera of the imaging subsystem is mounted to a robotic framework for moving the camera over the plate.

5. The system as recited in claim 1, and further comprising a means for exterminating a mosquito based on the determination by the computer of whether the particular mosquito in one of the multiple wells is male or female.

6. The system as recited in claim 5, wherein the means for exterminating the mosquito is a suction device.

7. The system as recited in claim 4, and further comprising a means for exterminating a mosquito based on the determination by the computer of whether the particular mosquito in one of the multiple wells is male or female, wherein the means for exterminating the mosquito is mounted to the robotic framework.

8. The system as recited in claim 7, wherein the means for exterminating the mosquito is a suction device.

9. A system for sex sorting of mosquitoes, comprising:
 a plate that includes multiple wells, with each of the multiple wells configured to receive a mosquito;
 a lid that is placed over the plate to enclose the multiple wells, with the lid including multiple viewing windows, with each of the multiple viewing windows aligned with and corresponding to one of the multiple wells; and
 an imaging subsystem, including
  a camera for capturing an image of a particular mosquito in one of the multiple wells through a respective one of the multiple viewing windows, and
  a computer including a processor programmed to execute instructions to (i) receive the image captured by the camera, and (ii) analyze the image to determine whether the particular mosquito in the image is male or female.

10. The system as recited in claim 9, wherein the camera of the imaging subsystem is mounted to a robotic framework for moving the camera over the plate.

11. The system as recited in claim 9, and further comprising a means for exterminating a mosquito based on the determination by the computer of whether the particular mosquito in one of the multiple wells is male or female.

12. The system as recited in claim 11, wherein the means for exterminating the mosquito is a suction device.

13. The system as recited in claim 10, and further comprising a means for exterminating a mosquito based on the determination by the computer of whether the particular mosquito in one of the multiple wells is male or female, wherein the means for exterminating the mosquito is mounted to the robotic framework.

14. The system as recited in claim 13, wherein the means for exterminating the mosquito is a suction device.

15. The system as recited in claim 5, wherein the means for exterminating the mosquito is operably connected to the computer, such that the computer can communicate instructions to activate the means for exterminating the mosquito after the computer determines whether the particular mosquito is male or female.

16. The system as recited in claim 7, wherein the means for exterminating the mosquito is operably connected to the computer, such that the computer can communicate instructions to activate the means for exterminating the mosquito after the computer determines whether the particular mosquito is male or female.

17. The system as recited in claim 11, wherein the means for exterminating the mosquito is operably connected to the computer, such that the computer can communicate instructions to activate the means for exterminating the mosquito after the computer determines whether the particular mosquito is male or female.

18. The system as recited in claim 13, wherein the means for exterminating the mosquito is operably connected to the computer, such that the computer can communicate instructions to activate the means for exterminating the mosquito after the computer determines whether the particular mosquito is male or female.

19. A system for sex sorting of mosquitoes, comprising:
 a plate that includes multiple wells, with each of the multiple wells configured to receive a mosquito;
 a robotic framework;
 a means for exterminating a mosquito mounted on the robotic framework; and
 an imaging subsystem, including
  a camera for capturing an image of a particular mosquito in one of the multiple wells, and
  a computer including a processor programmed to execute instructions to (i) receive the image captured by the camera, (ii) analyze the image to determine whether the particular mosquito is male or female, and (iii) if, the particular mosquito is female, activate the means for exterminating a mosquito to exterminate the particular mosquito.

20. The system as recited in claim 19, and further comprising a lid that is placed over the plate to enclose the multiple wells.

21. The system as recited in claim 20, wherein the lid includes multiple viewing windows, with each of the multiple viewing windows aligned with and corresponding to one of the multiple wells.

* * * * *